(12) United States Patent
Town

(10) Patent No.: X9441
(45) Date of Patent: Feb. 25, 1836

(54) STOCK, GUN, LATHE FOR

(76) Inventor: Abner Town

Abner Town.

Letters Patent.

The schedule referred to in these Letters Patent and making part of
the same containing a description in the words of the said Abner
Town himself of his improvement in the Eccentric Lathe for turning
Gun Stocks, Shoe and Boot Lasts &c.

To all persons to whom these presents shall come.
Abner Town of Woodbury in the county of Caladonia and State of
Vermont sends greeting. ——
Be it known that I the said Abner Town have invented construct
-ed made and applied to use a new and useful improvement in the art
of turning and in the construction of the gun Stock Lathe, called
Towns vibrating turning Machine. (or the improved Gun Stock lathe,)
Specified in the words following viz. Being an improvement on the gun
Stock lathe, designed for the purpose of turning gun stocks, lasts, boot
trees, hat blocks, and of turning to the shape of any given pattern.
The construction of the improved lathe or machine is such that both
the guide and fly wheels remain Stationary while in the operation of
turning the pattern & block pass them; whereas in the original gun Stock
lathe, those wheels are moveable and pass the pattern and block. both of
which remain Stationary; also in the improved machine the Pattern and
block have each a separate mandrill turned by a wheel which is not the
case in the original lathe. which improvement already mentioned in the con-
struction is designed to hold the block in a more firm position, leave the
work in a more finished State, render the machine more easily tended, and
facilitate turning. Also the construction of the machinery attached to the
carriage in the improvement is such as to produce a rocking motion in-
stead of the swinging motion of the original lathe.
The small hooks (added to the fly wheel) in the improved machine
or lathe are designed to save great labour in preparing the blocks The oval (instead of the circular surface of the guide wheel) and corres
-ponding curve of the hooks are designed to facilitate the operation of the
hooks upon the block. Construction
A frame is constructed by placing two thick plank 18 inches wide
in a position upright from a platform and connecting them by a plank
of the same description four feet ten inches above the platform, two timbers
4 feet 5 inches square also connect the end planks being inserted 2 ft.
1 inch below the top plank, 10 inches apart which are called carriage
bars, and serve for the carriage to run upon; length of frame inside
5 feet 2 inches two cross bars 4 inches square and 2 feet 10 inches in
length are bolted upon the under side of the cross bars near their cen
-tre 8 inches apart which project in front resting upon two posts called
front posts which posts are connected by a tie or girt
A carriage is constructed 3 feet 5 inches in length and 1 feet 5
inches wide and sides of which are 3 inches square, the ends 4
inches deep and 3 inches wide to slide lengthwise of the machine
upon the carriage bars. Within the carriage and six inches from
front side of it is placed a bar of iron 1¼ inches square resting by
means of arbors upon the ends of the carriage called the iron shaft
upon which at one end are placed two iron hubs 3 inches apart
each hub having two arms for the purpose of holding the mandrills
13 inches from the centre of the iron shaft which arms project at
such an angle as to carry the mandrill 22¼ inches from each
other. Between these arms on each hub is a short arm
7 inches in length for the purpose of holding the centre man
drill wheel.
Between the hubs on the iron shaft is a box upon which is a
small cog wheel 3 inches in diameter and also a band wheel
6 inches in diameter which wheels are connected and revolve
together upon the iron shaft.
Three cog wheels 11 inches in diameter are inserted in the arms
the arbors of two of which form the mandrills. the centre mandrill
wheel meshes with the other two and also with the small cog wheel Upon the [illegible] shaft ~~there~~ is a moveable hub having two [illegible] holding centres
corresponding with the mandrills between which centres and mandrel is the
patterns & block are confined. From the top plank is suspended a wheel
14 inches in diameter with an oval surface called the guide wheel against
which the pattern revolves — Upon the cross bars 7 inches in front is placed
a wheel 12 inches in diameter called the fly wheel with 4 or 6 hooks pro-
jecting 1 inch from the surface of the wheel and corresponding in shape
to the surface of the guide wheel, which hooks are sharpened & cut in
their revolution, two small hooks are fastened to the fly wheel, raised
but little, and placed in a manner to cut upon the opposite side of the
fly wheel from the large hooks, Upon the shaft of the fly wheel is a small band wheel under the
mandrill wheel and between the carriage bars, is a drum or shaft
called the short shaft, one end revolving in the end plank and the other
in a cross piece between the carriage bars called the centre cross piece
Upon the short shaft are band wheels of various sizes for the purpose
of varying the motion of the Machine.

Between the carriage bars at the end opposite the short shaft is a
screw of iron 2 feet 4½ inches in length with one band wheel, one end of
which revolves in the end plank and the other in same cross piece with
the short shaft. On the end of the carriage is a vice or box in the form
of blacksmiths tongs. which will open and shut upon the screw at pleasure by
means of a handle and and a lock or latch.

Underneath the carriage bars is a shaft revolving in each end plank called
the long shaft, on one end of which are various band wheels corresponding in
proportion to the band wheels on the short shaft on the other end is both a fixed
and loose or revolving band wheel for the purpose of being connected with the
moving power. Near the centre of the long shaft is a band wheel 2
feet and 2 inches in diameter called the large band wheel.

Motion: The long shaft is carried by being connected with water or
horse power, the fly wheel by being banded to the large band wheel — The
short shaft by being ~~cross~~ banded to the long shaft. The three mandrill
wheels, and small cog wheels by banding small cog wheel to short shaft
which last mentioned band is to be tightened by means of a friction wheel conconnecting with the handle which opens and shuts the nut or box on the screw. The carriage is put in motion by closing the box upon the screw. Three of the long arms which hold the mandrills & centres project in front and hold the block to be turned directly over the fly wheel and in contact with the hooks while the others are in the rear and elevated so as to rest the pattern against the guide wheel by which means a rocking motion is produced as the pattern is carried by the guide wheel the block at the same time passing by the hooks on the fly wheel, and is converted into the form of the pattern. 2^d. The foregoing dimensions are suitable for a machine for the purpose 1^st of turning lasts, boot trees &c but but should be enlarged for larger work. —— N. B. The screw is put in motion by being banded to a small shaft passing thro' the centre cross piece which shaft is banded to the short shaft.

In testimony that the above is a true specification of my said improvement as above described I have hereunto set my hand this 8^th day of June 1835

Abner Town.

Witnesses { Shubael Wheeler / Asa Aldon

1443 [illegible]

Ex^d. Ch.ff.